United States Patent [19]

Wilson et al.

[11] Patent Number: 5,012,517

[45] Date of Patent: Apr. 30, 1991

[54] ADAPTIVE TRANSFORM CODER HAVING LONG TERM PREDICTOR

[75] Inventors: Philip J. Wilson; Harprit Chhatwal, both of San Diego, Calif.

[73] Assignee: Pacific Communication Science, Inc., San Diego, Calif.

[21] Appl. No.: 339,991

[22] Filed: Apr. 18, 1989

[51] Int. Cl.⁵ .................................... G01L 5/00

[52] U.S. Cl. .................................... 381/31; 381/36

[58] Field of Search .................................... 381/31, 36

[56] References Cited

U.S. PATENT DOCUMENTS 4,184,049 1/1980 Crochiere et al. .................... 381/31

OTHER PUBLICATIONS

Max, Joel, "Quantization for Minimum Distortion", IRE Transactions on Information Theory, vol. IT-6, pp. 7-12, (Mar. 1960).

Tribolet, J., et al., "Frequency Domain Coding of Speech", IEEE Transactions on Acoustics, Speech and Signal Processing vol. ASSP-27, No. 3, pp. 512-530, (Oct. 1977).

Atal, B. S., "Predictive Coding of Speech at Low Bit Rates", IEEE Transactions on Communications, COM-30, No. 4, pp. 600-614, (Apr. 1982).

*Primary Examiner*—Emanuel S. Kemeny

*Attorney, Agent, or Firm*—Woodcock Washburn Kurtz Mackiewicz & Norris

[57] ABSTRACT

A method and apparatus for removing the periodicity from a speech signal in a transform coder prior to the quantization of the speech signal, which speech signal is a sampled time domain speech signal composed of information samples, the transform coder sequenctially segregating the speech signal into blocks of information samples, is shown to include apparatus and method for determining the pitch in each of the sample blocks, determininig a long term predetermined parameter (LTP) for each of the blocks based on the pitch determined for each block, calculating a periodicity value for each sample in the block wherein the calculation of the periodicity value is based upon the pitch and the long term predictor parameter, generating a revised block of difference samples by subtracting the periodically value from the corresponding sample, and performing adaptive transform coding on each of the difference blocks.

31 Claims, 6 Drawing Sheets

ADAPTIVE TRANSFORM CODER HAVING LONG TERM PREDICTOR

RELATED APPLICATIONS

The present application is related to and constitutes an improvement to the following applications all of which were filed on May 21, 1988 by the assignee of the present invention, namely, Improved Adaptive Transform Coding, Ser. No. 199,360, Speech Specific Adaptive Transform Coder, Ser. No. 199,015 and Dynamic Scaling in an Adaptive Transform Coder, Ser. No. 199,317, all of which are incorporated herein by reference. The present application is also related to Methods and Apparatus for Reconstructing Non-quantized Adaptively Transformed Voice Signals having Ser. No. 339,809, filed Apr. 8, 1989, owned by the Assignee of the present invention and filed concurrently.

FIELD OF THE INVENTION

The present invention relates to the field of speech coding, and more particularly, to improvements in the field of adaptive transform coding of speech signals wherein the resulting digital signal is maintained at a minimum bit rate.

BACKGROUND OF THE INVENTION

One of the first digital telecommunication carriers was the 24-voice channel 1.544 Mb/s T1 system, introduced in the United States in approximately 1962. Due to advantages over more costly analog systems, the T1 system became widely deployed. An individual voice channel in the T1 system is generated by band limiting a voice signal in a frequency range from about 300 to 3400 Hz, sampling the limited signal at a rate of 8 kHz, and thereafter encoding the sampled signal with an 8 bit logarithmic quantizer. The resultant signal is a 64 kb/s digital signal. The T1 system multiplexes the 24 individual digital signals into a single data stream.

Because the data transmission rate is fixed at 1.544 Mb/s, the T1 system is limited to 24 voice channels when using the 8 kHz sampling and 8 bit logarithmic quantizing scheme. In order to increase the number of channels and still maintain a system transmission rate of approximately 1.544 Mb/s, the individual signal transmission rate must be reduced from 64 kb/s to some lower rate. One method used to reduce this rate is known as transform coding.

In transform coding of speech signals, the individual speech signal is divided into sequential blocks of speech samples. The samples in each block are thereafter arranged in a vector and transformed from the time domain to an alternate domain, such as the frequency domain. Transforming the block of samples to the frequency domain creates a set of transform coefficients having varying degrees of amplitude. Each coefficient is independently quantized and transmitted. On the receiving end, the samples are de-quantized and transformed back into the time domain.

The importance of the transform coding is that the signal representation in the transform domain reduces the amount of redundant information, i.e. there is less correlation between samples. Consequently, fewer bits are needed to quantize a given sample block with respect to a given error measure (eg. mean square error distortion) than the number of bits which would be required to quantize the same block in the original time domain. Since fewer bits are needed for quantization, the transmission rate for an individual channel can be reduced.

While the transform coding scheme in theory satisfied the need to reduce the bit rate of individual T1 channels, historically the quantization process produced unacceptable amounts of noise and distortion.

In general, quantization is the procedure whereby an analog signal is converted to digital form. Max, Joel "Quantization for Minimum Distortion" IRE Transactions on Information Theory, Vol. IT-6 (March, 1960), pp. 7-12 (MAX) discusses this procedure. In quantization, the amplitude of a signal is represented by a finite number of output levels. Each level has a distinct digital representation. Since each level encompasses all amplitudes falling within that level, the resultant digital signal does not precisely reflect the original analog signal. The difference between the analog and digital signals is quantization noise. Consider for example the uniform quantization of the signal x, where x is any real number between 0.00 and 10.00, and where five output levels are available, at 1.00, 3.00, 5.00, 7.00 and 9.00, respectively. The digital signal representative of the first level in this example can signify any real number between 0.00 and 2.00. For a given range of input signals, it can be seen that the quantization noise produced is inversely proportional to the number of output levels. Additionally, in early quantization investigations for transform coding, it was found that not all transform coefficients were being quantized and transmitted at low bit rates.

Attempts to improve transform coding involved investigating the quantization process using dynamic bit assignment and dynamic step-size determination processes. Bit assignment was adapted to short term statistics of the speech signal, namely statistics which occurred from block to block, and step-size was adapted to the transform's spectral information for each block. These techniques became known as adaptive transform coding methods.

In adaptive transform coding, optimum bit assignment and step-size are determined for each sample block by adaptive algorithms which operate upon the variance of the amplitude of the transform coefficients in each block. The spectral envelope is that envelope formed by the variance of the transform coefficients in each sample block. Knowing the spectral envelope in each block, allows a more optimal selection of step size and bit allocation, yielding a more precisely quantized signal having less distortion and noise.

Since variance or spectral envelope information is developed to assist in the quantization process prior to transmission, this same information will be necessary in the de-quantization process at reception. Consequently, in addition to transmitting the quantized transform coefficients, adaptive transform coding also provides for the transmission of the variance or spectral envelope information. This is referred to as side information.

The spectral envelope represents in the transform domain the dynamic properties of speech, namely formants. Speech is produced by generating an excitation signal which is either periodic (voiced sounds), aperiodic (unvoiced sounds), or a mixture (eg. voiced fricatives). The periodic component of the excitation signal is known as the pitch. During speech, the excitation signal is filtered by a vocal tract filter, determined by the position of the mouth, jaw, lips, nasal cavity, etc. This filter has resonances or formants which determine the nature of the sound being heard. The vocal tract filter provides an envelope to the excitation signal. Since this envelope contains the filter formants, it is known as the formant or spectral envelope. Hence, the more precise the determination of the spectral envelope, the more optimal the step-size and bit allocation determinations used to code transformed speech signals.

The development of particular adaptive transform coding techniques was described in Improved Adaptive Transform Coding, Ser. No. 199,360 and will not be repeated herein. The novel apparatus and methods described in that case were an advance in the art because adaptive transform coding at a rate of 16 kb/s in a single so-called LSI digital signal processor became possible for the first time. Such results were achieved by generating an even extension of each block of time domain samples, generating an auto-correlation function from such extension, deriving linear prediction coefficients from the auto-correlation function and performing a Fast Fourier Transform on such linear prediction coefficients such that the variance or formant information of each transform coefficient was equal to the square of the gain of each FFT coefficient. It was also disclosed that the number of bits to be assigned to each transform coefficient was achieved by determining the logarithm of a predetermined base of the formant information of the transform coefficients then determining the minimum number of bits which will be assigned to each transform coefficient and then determining the actual number of bits to be assigned to each of the transform coefficients by adding the minimum number of bits to the logarithmic number. The problem with this device was that as the transmission rate was reduced below 16 kb/s, not all portions of the signal were quantized and transmitted.

One reason for losing essential speech elements in early adaptive transform coders was that such coders were non-speech specific. In speech specific techniques both pitch and formant (i.e. spectral envelope) information are taken into account during bit assignment to ensure that certain information was assigned bits and quantized. One prior speech specific technique described in Tribolet, J., et al. "Frequency Domain Coding Of Speech", IEEE Transactions On Acoustics, Speech, and Signal Processing, Vol. ASSP-27, No. 3 (October, 1977), pp. 512–530 took pitch information, or pitch striations, into account by generating a pitch model from the pitch period and the pitch gain. To determine these two factors, this technique searched the pseudo-ACF to determine a maximum value which became the pitch period. The pitch gain was thereafter defined as the ratio between the value of the pseudo-ACF function at the point where the maximum value was determined and the value of the pseudo-ACF at its origin. With this information the pitch striations, i.e. a pitch pattern in the frequency domain, could be generated.

To generate the pitch pattern in the frequency domain using this prior technique, one would define a time domain impulse sequence. This sequence was windowed by a trapezoidal window to generate a finite sequence of length 2N. To generate a spectral response for only N points, a 2N-point complex FFT was taken of the sequence. The magnitude of the result, when normalized for unity gain, yielded the required spectral response. In order to generate the final spectral estimate, the pitch striations and the spectral envelope were multiplied and normalized. In graphing the combined pitch striation and spectral envelope information, the pitch striations appear as a series of "U" shaped curves wherein there exists a number of replications in a 2N-point window.

This entire process was adaptively performed for each sample block. The problem with this prior technique was its implementation complexity. In Speech Specific Adaptive Transform Coder, Ser. No. 199,015, pitch striations were taken into account with a much simpler implementation.

Consider a case, in light of the previously described Tribolet, et al. technique, where the pitch period is one (1) and the window used to generate a finite sequence is rectangular. The resultant spectral response of the pitch is a single "U" shape. In Ser. No. 199,015, it was said that for different values of the pitch period, other than one (1), the spectral response, is solely a sampled version of the pitch spectral response where the pitch period is one. Additionally, it was stated that the differences between the pitch striations for different values of pitch gain, maintaining the same pitch period, when scaled for energy and magnitude, are mainly related to the width of the "U" shape. Based on the above, it is was determined that it was not necessary to adaptively determine the pitch spectral response for each sample block, but rather, such information was generated by using information developed before hand. The pitch spectral response, was adaptively generated from a look-up-table developed before hand and stored in data memory.

Before the look-up-table was sampled to generate pitch information, it was first adaptively scaled for each sample block in relation to the pitch period and the pitch gain. Once the scaling factor was determined, the look-up-table was multiplied by the scaling factor and the resulting scaled table was sampled modulo 2N to determine the pitch striations.

Similar to Ser. No. 199,360, the problem with this technique is that while providing good performance at 16 kb/s, the same problem exhibited by prior systems emerged at rates of approximately 9.6 kb/s, namely certain speech elements Were lost due to non-quantization. This loss was particularly apparent for sounds such as "sh", "th", "ph", "sc" and "pth".

In Atal, B.S., Predictive Coding of Speech at Low Bit Rates, IEEE Transactions on Communications, Vol. COM-30, No. 4 (April, 1982), pages 600–614, it is suggested that the use of socalled adaptive predictive coding of speech signals can achieve transmission rates of 10 kb/s or less.

In predictive coding redundant structure is now removed from a time domain signal which is thereafter quantized and transmitted. Such structure is removed by estimating a predictor value and subtracting that value from a current signal value. The predictor is transmitted separately and added back to the time domain signal by the receiver. The predictor is said to include two components, one based on the short-time spectral envelope of the speech signal and the other based on the short-time spectral fine structure, which is determined mainly by the pitch period and the degree of voice periodicity. Atal also suggests the use of noise shaping in predictive coding to control the spectrum of the quantizing noise. Particularly, Atal utilizes a pre-filter/post-filter approach to produce a noise-shaped predictive model spectrum. The problem with the Atal approach is its implementation complexity. It will also be noted that until the present invention, transform coding and predictive coding were separate and distinct techniques.

Accordingly, a need still exists for an adaptive transform coder which is capable of efficient operation at lower bit rates, has low noise levels, and which is capable of reasonable cost and processing time implementation.

SUMMARY OF THE INVENTION

The objects and advantages of the invention are achieved in an apparatus and method for removing the periodicity from a speech signal in a transform coder prior to the quantization of the speech signal, which speech signal is a sampled time domain speech signal composed of information samples, the transform coder sequentially segregating the speech signal into blocks of information samples, is shown to include apparatus and method for determining the pitch in each of the sample blocks, determining a long term prediction parameter for each of the blocks based on the pitch determined for each block, calculating a periodicity value for each sample in the block wherein the calculation of the periodicity value is based upon the pitch and the long term predictor parameter, generating a revised block of difference samples by subtracting the periodicity value from the corresponding sample, and performing adaptive transform coding on each of the difference blocks.

These and other objects and advantages of the invention will become more apparent from the following detailed description when taken in conjunction with the following drawings.

DETAILED DESCRIPTION OF THE PREFERRED EMBODIMENT

As will be more completely described with regard to the figures, the present invention is embodied in a new and novel apparatus and method for adaptive transform coding wherein rates have been significantly reduced. Generally the present invention has reduced transmission rates by reducing the signal to be quantized. In other words, a transform coder in accordance with the present invention reduces the information contained in the voice signal to a minimum prior to the quantization operation. According to the present invention, for the first time transmission rates can be reduced to as low as 8 kb/s in an apparatus capable of reasonable cost and processing time implementation.

The primary reduction in the transmission rate results from the removal of periodicity from the voice signal. Periodicity information, once removed, is transmitted as side information and added back to the voice signal by the receiver. In order to make the technique adaptive, periodicity is determined and removed from block to block, as will be described herein. As used in this application, the determination and removal of periodicity is referred to as the long term predictor technique (LTP).

Figure 1:
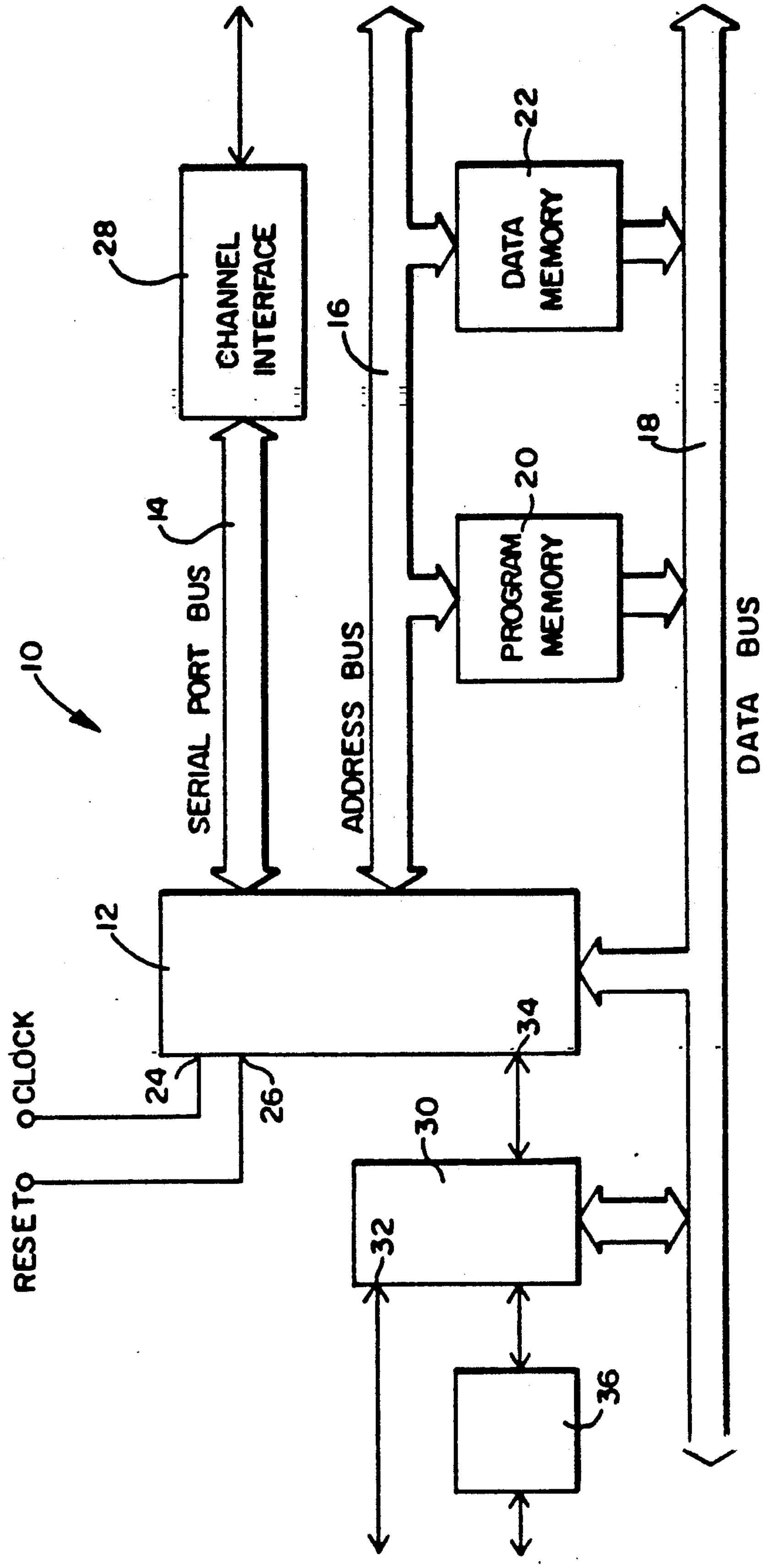
FIG. 1 is a schematic view of an adaptive transform coder in accordance with the present invention.

An adaptive transform coder in accordance with the present invention is depicted in FIG. 1 and is generally referred to as 10. The heart of coder 10 is a digital signal processor 12, which in the preferred embodiment is a TMS320C25 digital signal processor manufactured and sold by Texas Instruments, Inc. of Houston, Texas. Such a processor is capable of processing pulse code modulated signals having a word length of 16 bits.

Processor 12 is shown to be connected to three major bus networks, namely serial port bus 14, address bus 16, and data bus 18. Program memory 20 is provided for storing the programming to be utilized by processor 12 in order to perform adaptive transform coding in accordance with the present invention. Such programming is explained in greater detail in reference to FIGS. 2 through 9. Program memory 20 can be of any conventional design, provided it has sufficient speed to meet the specification requirements of processor 12. It should be noted that the processor of the preferred embodiment (TMS320C25) is equipped with an internal memory. Although not yet incorporated, it is preferred to store the adaptive transform coding programming in this internal memory.

Data memory 22 is provided for the storing of data which may be needed during the operation of processor 12, for example, logarithmic tables the use of which will become more apparent hereinafter.

A clock signal is provided by conventional clock signal generation circuitry, not shown, to clock input 24. In the preferred embodiment, the clock signal provided to input 24 is a 40 MHz clock signal. A reset input 26 is also provided for resetting processor 12 at appropriate times, such as when processor 12 is first activated. Any conventional circuitry may be utilized for providing a signal to input 26, as long as such signal meets the specifications called for by the chosen processor.

Processor 12 is connected to transmit and receive telecommunication signals in two ways. First, when communicating with adaptive transform coders constructed in accordance with the present invention, processor 12 is connected to receive and transmit signals via serial port bus 14. Channel interface 28 is provided in order to interface bus 14 with the compressed voice data stream. Interface 28 can be any known interface capable of transmitting and receiving data in conjunction with a data stream operating at the specified transmission rate.

Second, when communicating with existing 64 kb/s channels or with analog devices, processor 12 is connected to receive and transmit signals via data bus 18. Converter 30 is provided to convert individual 64 kb/s channels appearing at input 32 from a serial format to a parallel format for application to bus 18. As will be appreciated, such conversion is accomplished utilizing known codes and serial/parallel devices which are capable of use with the types of signals utilized by processor 12. In the preferred embodiment processor 12 receives and transmits parallel 16 bit signals on bus 18. In order to further synchronize data applied to bus 18, an interrupt signal is provided to processor 12 at input 34. When receiving analog signals, analog interface 36 serves to convert analog signals by sampling such signals at a predetermined rate for presentation to converter 30. When transmitting, interface 36 converts the sampled signal from converter 30 to a continuous signal.

Figure 2:
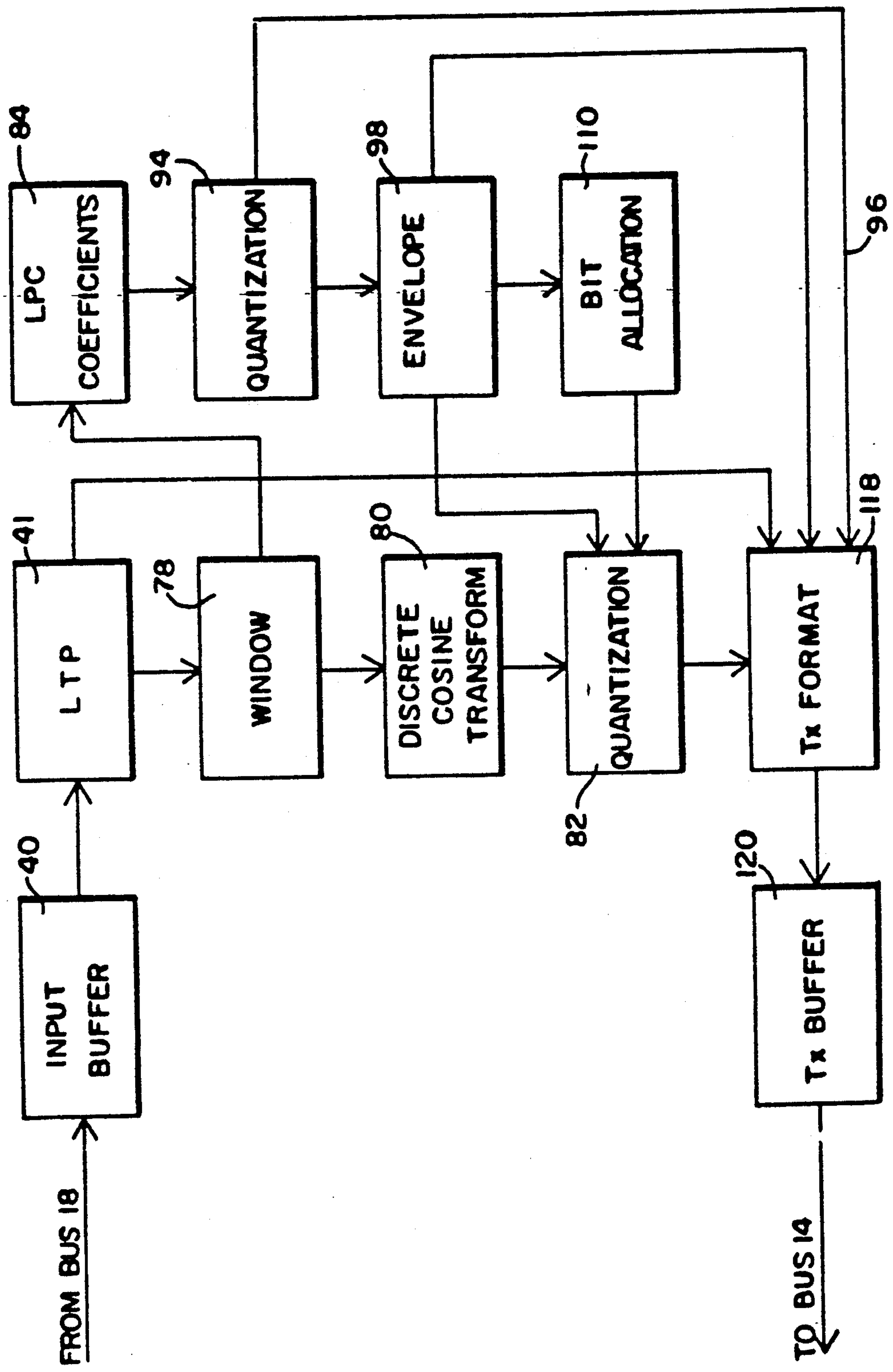
FIG. 2 is a general flow chart of those operations performed in the adaptive transform coder shown in FIG. 1, prior to transmission.
Figure 3:
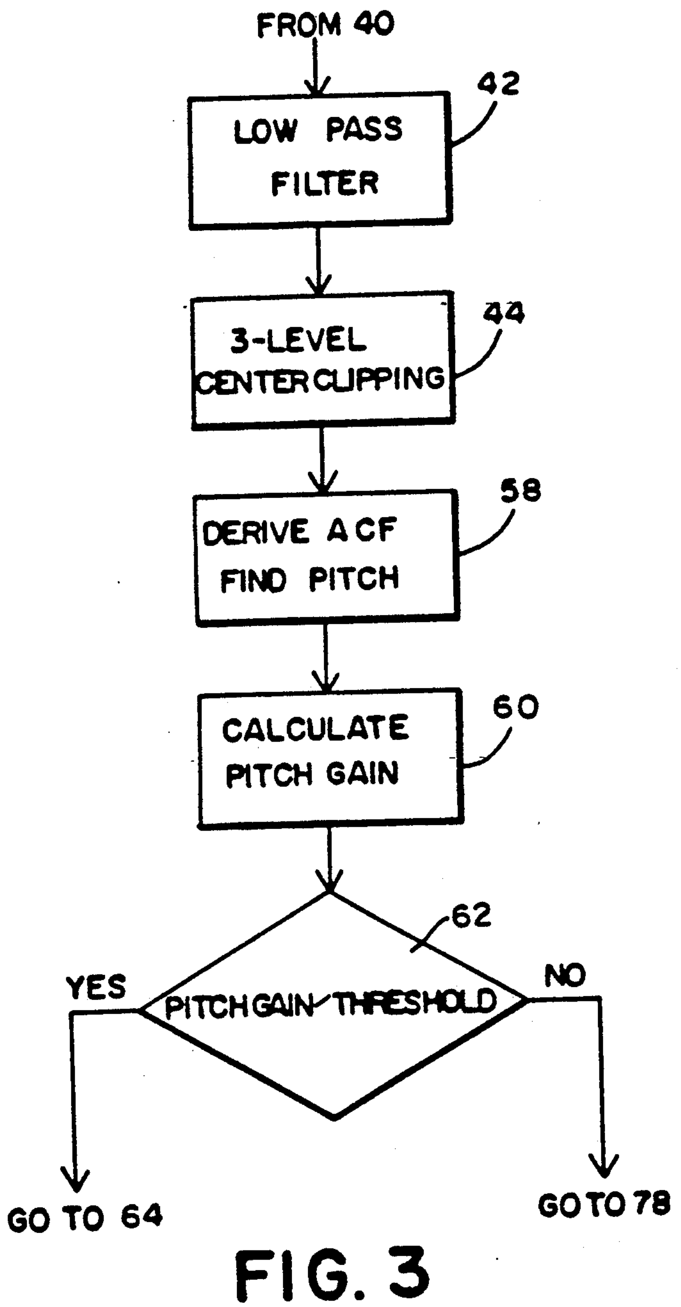
FIG. 3 is a partial more detailed flow chart of those operations shown in FIG. 2, when performing a Long Term Predictor (LTP) operation.

With reference to FIGS. 2-9, the programming will be explained which, when utilized in conjunction with those components shown in FIG. 1, provides a new and novel adaptive transform coder. Adaptive transform coding for transmission of telecommunications signals in accordance with the present invention is shown in FIG. 2. Telecommunication signals to be coded and transmitted appear on bus 18 and are presented to input buffer 40. Such telecommunication signals are sampled signals made up of 16 bit PCM representations of each sample where sampling occurs at a frequency of 8 kHz. For purposes of the present description, assume that a voice signal sampled at 8 kHz is to be coded for transmission. Buffer 40 accumulates a predetermined number of samples into a sample block. In the preferred embodiment, there are 120 samples in each block. LTP is performed on each block at 41. The LTP operation is more particularly described in relation to FIGS. 3 to 5. Since LTP reduces the voice signal prior to quantization, the LTP process occurs at 41.

The periodicity or pitch based information removal/reintroduction process is achieved through the use of a digital filter technique which has been termed herein as LTP. The fundamental prerequisite for deriving an LTP filter is the calculation of a precise pitch or fundamental frequency estimate.

Determining pitch is not new per se. Previously, pitch has been determined by first deriving an autocorrelation function (ACF) of a block of samples and then searching the ACF over a specified range for a maximum value which was termed the pitch. (See Tribolet, et al.) Unfortunately, it has been discovered that components other than pitch may be present. Consequently, the ACF derived from a block of samples can exhibit spurious peaks which may lead to inaccurate pitch estimates. In accordance with the present invention, a block of samples supplied by buffer 40 is first filtered through low pass filter 42. In the preferred embodiment low pass filter 42 is an eight-tap finite impulse response filter having 3 dB cutoff frequencies at 1800 Hz and 2400 Hz. It will be noted that the frequency range of interest is from approximately 50 Hz to 1650 Hz. This range permits the accommodation of dual tone multifrequency (DTMF) signals. One of the properties of the coder of the present invention is its ability to pass DTMF information. Consequently, the filter is preferred to include the frequency range of 697–1633 Hz. The filtered signal is thereafter processed utilizing a 3-level center clipping technique at 44.

Figure 4:
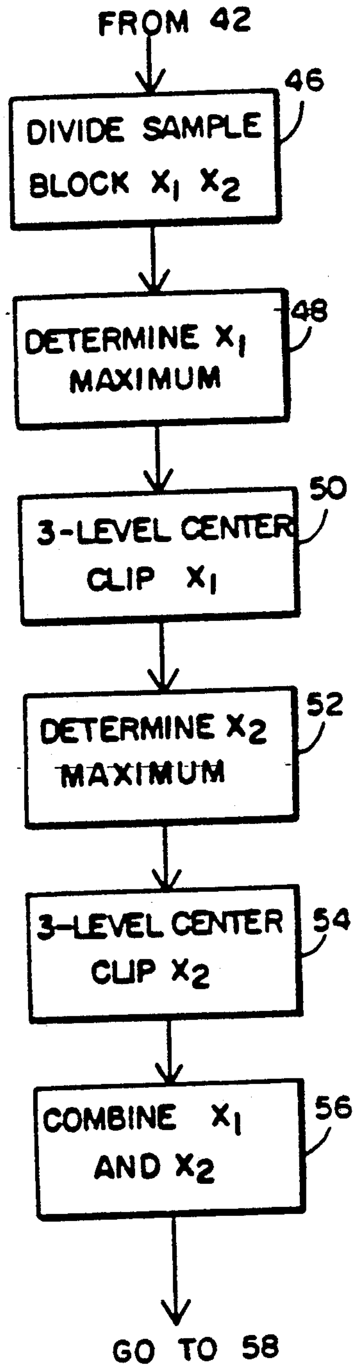
FIG. 4 is a partial more detailed flow chart of those operations shown in FIG. 2, when performing a Long Term Predictor (LTP) operation.
Figure 5:
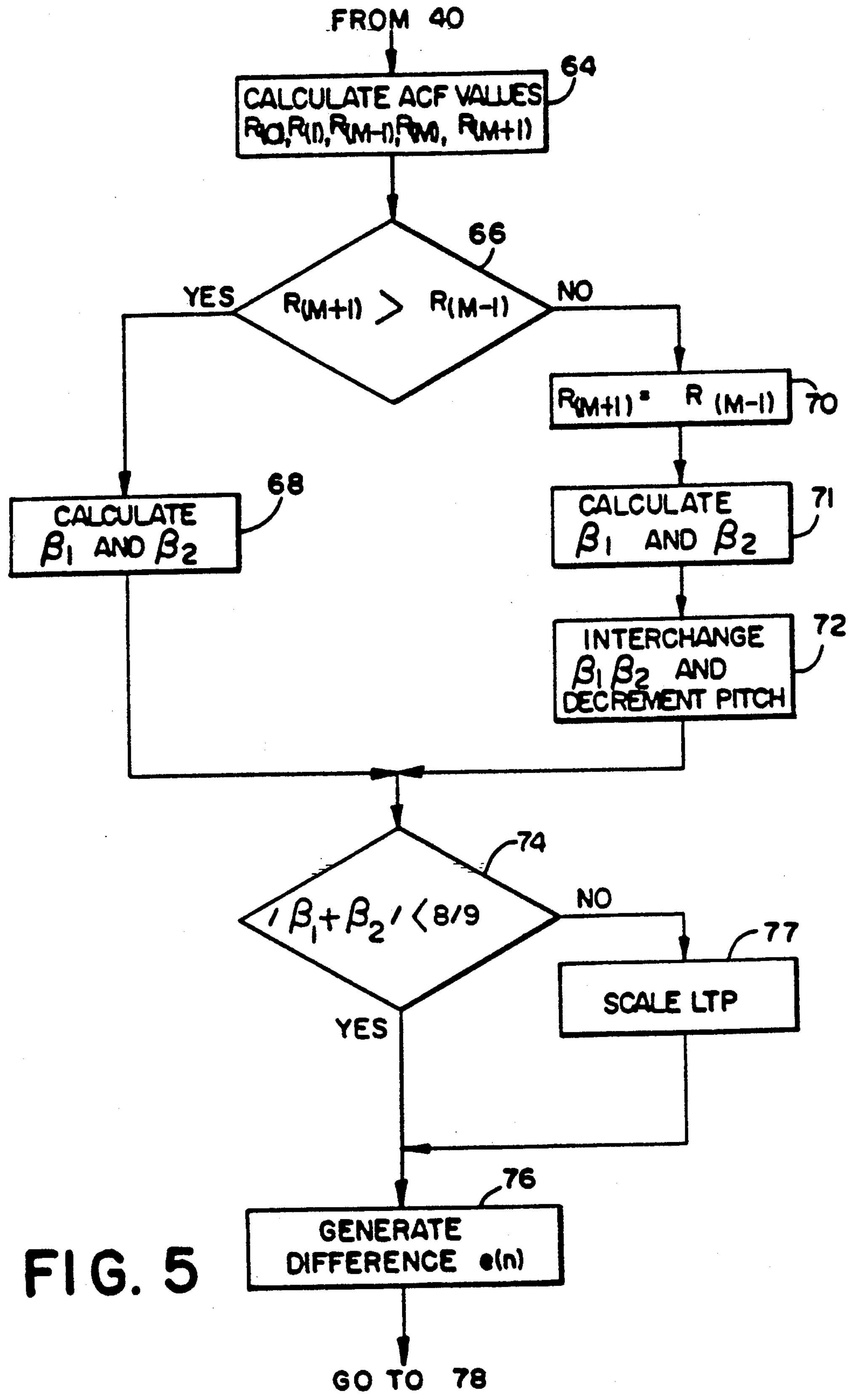
FIG. 5 is a partial more detailed flow chart of those operations shown in FIG. 2, when performing a Long Term Predictor (LTP) operation.
Figure 6:
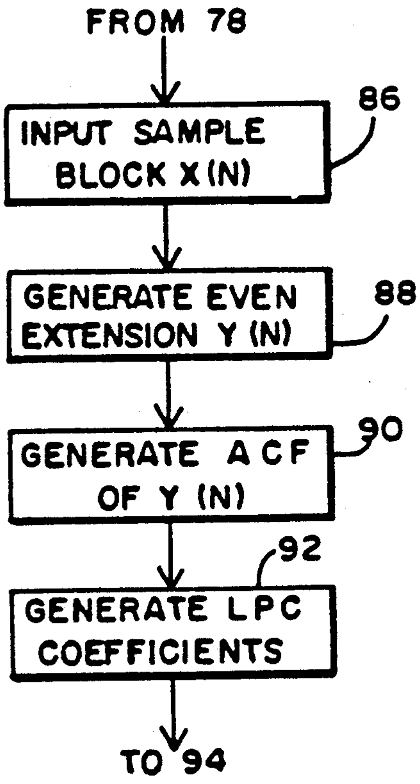
FIG. 6 is a more detailed flow chart of the LPC coefficients operation shown in FIGS. 2 and 9.

Referring briefly to FIG. 4, the 3-level center clipping technique will be described in greater detail. It will be noted that center level clipping in relation to determining pitch in a speech signal is not new. Dubnowski, et al., "Real-Time Digital Hardware Pitch Detector", IEEE Transactions on Acoustics, Speech and Signal Processing, Vol. ASSP-24, No. 1 (February 1987), discloses one such technique. However, center level clipping in relation to an LTP operation is new.

The sample block from low pass filter 42 is first divided into two equal segments at 46. These segments are designated in this application $x_1$ and $x_2$. The first half $x_1$ of the sample block is evaluated at 48 to determine the absolute maximum value contained in $x_1$. This absolute maximum value is used to derive a threshold, which in the preferred embodiment is 57% of the maximum value. It should be noted that the reason for splitting the time domain signal in half is to protect against amplitude fluctuations between blocks. Such fluctuations could effect the completeness of the subsequently developed auto correlation function and the eventual pitch determination. To prevent such events, the time domain signal is split in half.

The 3-level center clip operation is performed at 50 in accordance with the following formula:

$$c(n) \begin{aligned} &= +1 \quad s(n) \geqq T_c \\ &= -1 \quad s(n) \leqq -T_c \\ &= 0 \quad \text{otherwise} \end{aligned} \tag{1}$$

where $T_c$=amplitude threshold.

It will be seen from the above that only those values which exceed the threshold values (57% of the maximum determined at 48) are retained. Consequently, the maximum values have been emphasized which emphasis will become apparent in relation to later processing described in FIG. 3. Having performed the 3-level center clip operation with relation to the first half $x_1$ of the sample block, the absolute maximum for the second half $x_2$ of the sample block is determined at 52. The 3-level center clip operation is performed in relation to $x_2$ at 54. It will be noted that the threshold value utilized at step 54 is based upon the absolute maximum determined at 52. After performing the 3-level center clip operation at 54, the center clipped results are combined into a whole processed block at 56.

Having performed a 3-level center clipping operation in relation to the entire sample block, the autocorrelation function of the sample block is now derived at 58 and searched to determine the maximum autocorrelation function value, denoted ACF (M). This maximum value is defined as the pitch. Having effectively determined the pitch at 58, pitch gain is now calculated at 60.

Pitch gain is calculated according to the following formula:

$$\text{Pitch Gain} = \frac{R(M)}{R(O)} \tag{2}$$

where

R(M) is the value of the autocorrelation function at the pitch value (M); and

R(O) is the value of the autocorrelation function at its origin.

Having determined the pitch gain at 60, it is now determined whether the pitch gain is greater than a threshold value at 62. It will be noted that the pitch gain is a ratio and thus is a dimensionless number. In the preferred embodiment, the threshold used at step 62 is the value 0.25. If the pitch gain is larger than this threshold value, the block of samples is termed a voiced block. If the pitch gain is less than the threshold value, the sample block is termed a non-voiced block. The significance of whether a sample block is voiced or non-voiced is important only in relation to the preferred embodiment of the present invention. It is within the scope of the present invention to perform an LTP operation on each sample block. However, it has been discovered that the LTP need not be performed on every sample block. Blocks for which the LTP operation is not necessary are non-voiced blocks. In non-voiced blocks, periodicity is small. Consequently, its removal is unnecessary and a waste of time. In the preferred embodiment of the present invention, the LTP operation is completed only with respect to sample blocks which are determined to be voiced sample blocks.

At this point the adaptive transform coder 10 has determined the pitch and the pitch gain adaptively in relation to a particular sample block. The LTP operation now removes pitch based information in relation to the operation shown in FIG. 5. The LTP operation removes pitch based information by extracting the difference between a given sample in the sample block and the corresponding sample from the previous pitch period. This operation is performed in relation to each sample in the sample block. In effect, the basic periodicity of the sample block caused by pitch-based components is being reduced by the LTP operation. The result of the LTP operation is a difference signal e(n) in terms of the input speech waveform or sample block s(n) as follows:

$$e(n)=s(n)-\alpha s(n-M) \quad (3)$$

where $\alpha$=constant, which is generally equal to the pitch gain s(n)=speech signal at time instant n;

e(n)=difference signal; and

M=Pitch.

Unfortunately, only integral values of Pitch (M) are allowed, since equation (3) is a one tap predictor which takes only Pitch (M) into account. Quite often, however, the value of interest, i.e. that value which removes the greatest periodicity, is a non-integral value. In the preferred embodiment, the difference signal e(n) is determined according to a two (2) tap predictor according to the following formula:

$$e(n)=s(n)-\beta_1\cdot s(n-M)-\beta_2\cdot s(n-M-1) \quad (4)$$

The modifying terms $\beta_1$ and $\beta_2$ are calculated in accordance with the following formula:

$$\beta_1=\frac{R(O)R(M)-R(1)R(M+1)}{[R(O)^2-R(1)^2]}; \quad (5)$$

$$\beta_2=\frac{R(O)R(M+1)-R(1)R(M)}{[R(O)^2-R(1)^2]} \quad (6)$$

$\beta_1$ and $\beta_2$ are termed the LTP parameters. It will be seen from the above that the difference signal e(n) is constituted by a linear combination of samples having time lags relating to the pitch calculated at 58.

Referring again to FIG. 5, use of the equations 4, 5 and 6 will be described. Various autocorrelation function values are determined at 64 in relation to the original sample block generated by buffer 40. The values which are calculated are as follows:

R(O)=the ACF value at the origin;

R(1)=the ACF value at 1;

R(M−1)=the ACF value at the pitch −1;

R(M)=the ACF value at the pitch; and

R(M+1)=the ACF value at the pitch +1.

It will be noted that in relation to the above operations it may become necessary to utilize samples which are contained in blocks on either side, i.e. leading or trailing, of the sample block being operated upon. Consequently it will be necessary to store a number of sequential blocks of samples, which can be accomplished for example by buffer 40.

It will also be noted that the above equations rely upon the samples which occur at time lags of M and M+1 as forming the estimate of the current sample. However, it may be desirable to utilize samples having time lags of M−1 and M samples to form an alternative estimate. Although such an operation is not necessary in order to practice the principles of the present invention, such an operation is utilized in the preferred embodiment of the present invention. Accordingly, at 66 it is determined whether the ACF value at M+1 is greater than the ACF value at M−1. If the ACF value at M+1 is greater, the LTP parameters $\beta_1$ and $\beta_2$ are calculated according to equation numbers 5 and 6.

If the ACF value at M+1 is not greater, the adaptive transform coder then calculates the LTP parameters according to the operations described at 70, 71 and 72. At 70, the value of R(M+1) is made equal to the value R(M−1). Then, $\beta_1$ and $\beta_2$ are calculated using equations 5 and 6 at 71. The values calculated for $\beta_1$ and $\beta_2$ are interchanged at 72 so that $\beta_1$ is made to be the value calculated at 71 for $\beta_1$ and $\beta_2$ is made to be the value calculated at 71 for $\beta_1$. The pitch (M) is decremented by 1 and transmitted as side information.

After interchanging results at 72, $\beta_1$ and $\beta_2$ are utilized as the LTP parameters.

In order to protect against instabilities, the adaptive transform coder of the present invention restricts the sum of $\beta_1$ and $\beta_2$. This is achieved in FIG. 5 by first determining whether the absolute value of $\beta_1+\beta_2$ is less than 8/9 at 74. If the absolute value of $\beta_1+\beta_2$ is less than 8/9, the difference signal e(n) is generated at 76 according to equation 4. If the absolute value of $\beta_1+\beta_2$ is not less than 8/9, the LTP parameters are scaled at 77 so that $\beta_1+\beta_2=8/9$. Once the LTP parameters are made equal to 8/9 at 77 the difference signal e(n) is generated at 76 using equation 4.

Although previously mentioned, it will again be noted at this point that in order to reconstruct the signal s(n) it will be necessary to transmit as side information the value of $\beta_1$, $\beta_2$ and the pitch (M). The difference signal generated at 76 is thereafter provided for a windowing operation to occur at 78.

Each block of samples as modified by LTP is windowed at 78. In the preferred embodiment the windowing technique utilized is a trapezoidal window [h(sR−N)] where each block of N speech samples are overlapped by R samples.

The subject block is transformed from the time domain to the frequency domain utilizing a discrete cosine transform at 80. Such transformation results in a block of transform coefficients which are quantized at 82. Quantization is performed on each transform coefficient by means of a quantizer optimized for a Gaussian signal, which quantizers are known (See MAX). The choice of gain (step-size) and the number of bits allocated per individual coefficient are fundamental to the adaptive transform coding function of the present invention. Without this information, quantization will not be adaptive.

In order to develop the gain and bit allocation per sample per block, consider first a known formula for bit $$R_i = R_{ave} + 0.5*log2[V_i^2/V_{block}^2] \quad (7)$$

where:

$$V_{block}^2 = n^{th}root\ of\ [Product_{i=1,N} v_i^2] \quad (8)$$

$$R_{Total} = Sum_{i=1,N}[R_i] \quad (9)$$

where:

$R_i$ is the number of bits allocated to the $i^{th}$ DCT coefficient;

$R_{Total}$ is the total number of bits available per block;

$R_{ave}$ is the average number of bits allocated to each DCT coefficient;

$v_i^2$ is the variance of the $i^{th}$ DCT coefficient; and $V_{block}^2$ is the geometric mean of $v_i$ for DCT coefficients.

Equation (7) is a bit allocation equation from which the resulting $R_i$, when summed, should equal the total number of bits allocated per block. The following derivation reduces implementation requirements and solves dynamic range problems associated with performing calculations using 16-bit fixed point arithmetic, as is required when utilizing the processor of the preferred embodiment. Equation (7) may be reorganized as follows:

$$R_i = [R_{ave} - log_2(V_{block}^2)] + 0.5*log_2(v_i^2) \quad (10)$$

Since the terms within square brackets can be calculated beforehand and since they are not dependent on the coefficient index (i), such terms are constant and may be denoted as Gamma. Hence equation (10) may be rewritten as follows:

$$R_i = Gamma + 0.5*S_i \quad (11)$$

$$S_i = log_2(v_i^2) \quad (12)$$

The term $v_i^2$ is the variance of the $i^{th}$ DCT coefficient or the value the $i^{th}$ coefficient has in the spectral envelope. Consequently, knowing the spectral envelope allows the solution to the above equations.

$$H(z) = Gain/(1 + Sum_{k=1,P}[a_k * z^{-k}]) \quad (13)$$

evaluated at:

$$z = e^{i\ 2\ pi\ (i/2N)}[i = 0, N-1]$$

where H(z) is the spectral envelope of DCT and $a_k$ is the linear prediction coefficient. Equation (13) defines the spectral envelope of a set of LPC coefficients. The spectral envelope in the DCT domain may be derived by modifying the LPC coefficients and then evaluating (13).

As shown in FIG. 2, the windowed coefficients are acted upon to determine a set of LPC coefficients at 84. The technique for determining the LPC coefficients is shown in greater detail in FIG. 6. The windowed sample block is designated x(n) at 86. An even extension of x(n) is generated at 88, which even extension is designated y(n). Further definition of y(n) is as follows:

$$\begin{aligned} y(n) &= x(n) & n &= 0, N-1 \\ &= x(2N-1-n) & n &= N, 2N-1 \end{aligned} \quad (14)$$

An autocorrelation function (ACF) of (14) is generated at 90. The ACF of y(n) is utilized as a pseudo-ACF from which LPCs are derived in a known manner at 92. Having generated the LPCs ($a_k$), equation (13) can now be evaluated to determine the spectral envelope. It will be noted in FIG. 2, that in the preferred embodiment the LPCs are quantized at 94 prior to envelope generation. Quantization at this point serves the purpose of allowing the transmission of the LPCs as side information at 96.

Figure 7:
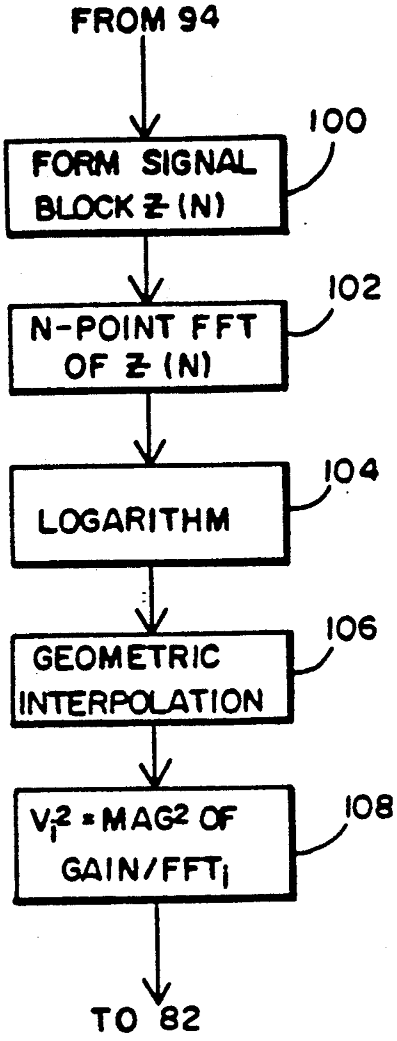
FIG. 7 is a more detailed flow chart of the envelope generation operation shown in FIGS. 2 and 9.

As shown in FIG. 2, the spectral envelope is determined at 98. A more detailed description of these determinations is shown in FIG. 7. A signal block z(n) is formed at 100, which block is reflective of the denominator of Equation (13). The block z(n) is further defined as follows:

$$\begin{aligned} z(n) &= 1.0 & n &= 0 \\ &= a_n & n &= 1, P \\ &= 0.0 & n &= P+1, 2N-1 \end{aligned} \quad (15)$$

Block z(n) is thereafter evaluated using a fast fourier transform (FFT). More specifically, z(n) is evaluated at 102 by using an N-point FFT where z(n) only has values from 0 to N−1. Such an operation yields the results $v_i^2$ for i=0, 2, 4, 6, . . . , N−2. Since (14) requires the $Log_2$ of $v_i^2$, the logarithm of each variance is determined at 104. To get the odd ordered values, geometric interpolation is performed at 106 in the log domain of $v_i^2$.

It is also possible, although not preferred, to utilize a 2N-point FFT to evaluate z(n). In such a situation it will not be necessary to perform any interpolation. The problem with using a 2N-point FFT is that it takes more processing time than the preferred method since the FFT is twice the size.

The variance ($v_i^2$) is determined at 108 for each DCT coefficient determined at 80. The variance $v_i^2$ is defined to be the magnitude of (13) where H(z) is evaluated at $$z = e^{i\ 2\ pi\ (i/2N)} for\ i = 0, N-1. \quad (16)$$

Put more simply, consider the following:

$$v_i^2 = Mag.^2 of\ ]Gain/FFT_i] \quad (17)$$

The term $v_i^2$ is now relatively easy to determine since the $FFT_i$ denominator is the $i^{th}$ FFT coefficient determined at 106. Having determined the spectral envelope, bit allocation is performed at 110.

It will be recalled that equations (7)–(9) set out a known technique for determining bit allocation. Thereafter equations (11) and (12) were derived. Only one piece remains to perform simplified bit allocation. By substituting equation (11) in equation (9) it follows that:

$$R_{Total} = 0.05*Sum_{i=1,N}[S_i] + N*Gamma \quad (18)$$

Rearranging (18) yields the following:

$$Gamma = [R_{Total} - 0.5*Sum_{i=1,N}(S_i))]/N \quad (19)$$

where N is the number of samples per block and $R_{Total}$ is the number of bits available per block.

Figure 8:
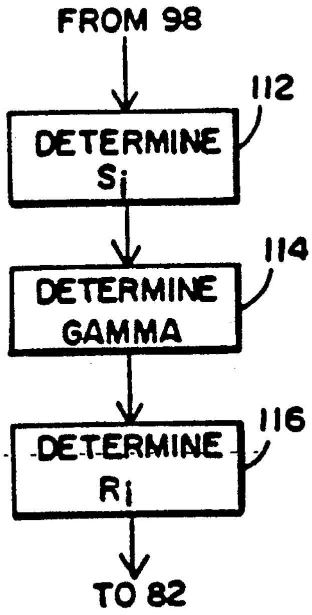
FIG. 8 is a more detailed flow chart of the integer bit allocation operation shown in FIGS. 2 and 9.

The bit allocation performed at 110 is shown in greater detail in FIG. 8. Utilizing (12), each $S_i$ is determined at 112, a relatively simple operation. Having determined each $S_i$, Gamma is determined at 114 using (18), also a relatively simple operation. In the preferred embodiment, the number of samples per block is 128. Consequently, N is known from the beginning.

The number of bits available per block is also known from the beginning. Keeping in mind that in the preferred embodiment each block is being windowed using a trapezoidal shaped window and that sixteen samples are being overlapped, eight on either side of the window, the frame size is 120 samples. If transmission is occurring at a fixed frequency of, for example, 9.6 kb/s and since 120 samples takes approximately 15 ms (the number of samples 120 divided by the sampling frequency of 8 kHz), the total number of bits available per block is 144. Fourteen bits are required for transmitting the LTP information plus the pitch information. The number of bits required to transmit the LPC coefficient side information is also known. Consequently, $R_{Total}$ is also known from the following:

$$R_{Total}=144-\textit{bits used with side information} \tag{20}$$

Since each $S_i$, $R_{Total}$, and N are all now known, determining Gamma at 114 is relatively simple using (18). Knowing each $S_i$ and Gamma, each $R_i$ is determined at 116 using (11). Again a relatively simple operation. This procedure considerably simplifies the calculation of each $R_i$, since it is no longer necessary to calculate the geometric mean, $V_{block}^2$, as called for by (10). A further benefit in utilizing this procedure is that using S' as the input value to (11) reduces the dynamic range problems associated with implementing an algorithm such as (2) in fixed-point arithmetic for real time implementation.

Figure 9:
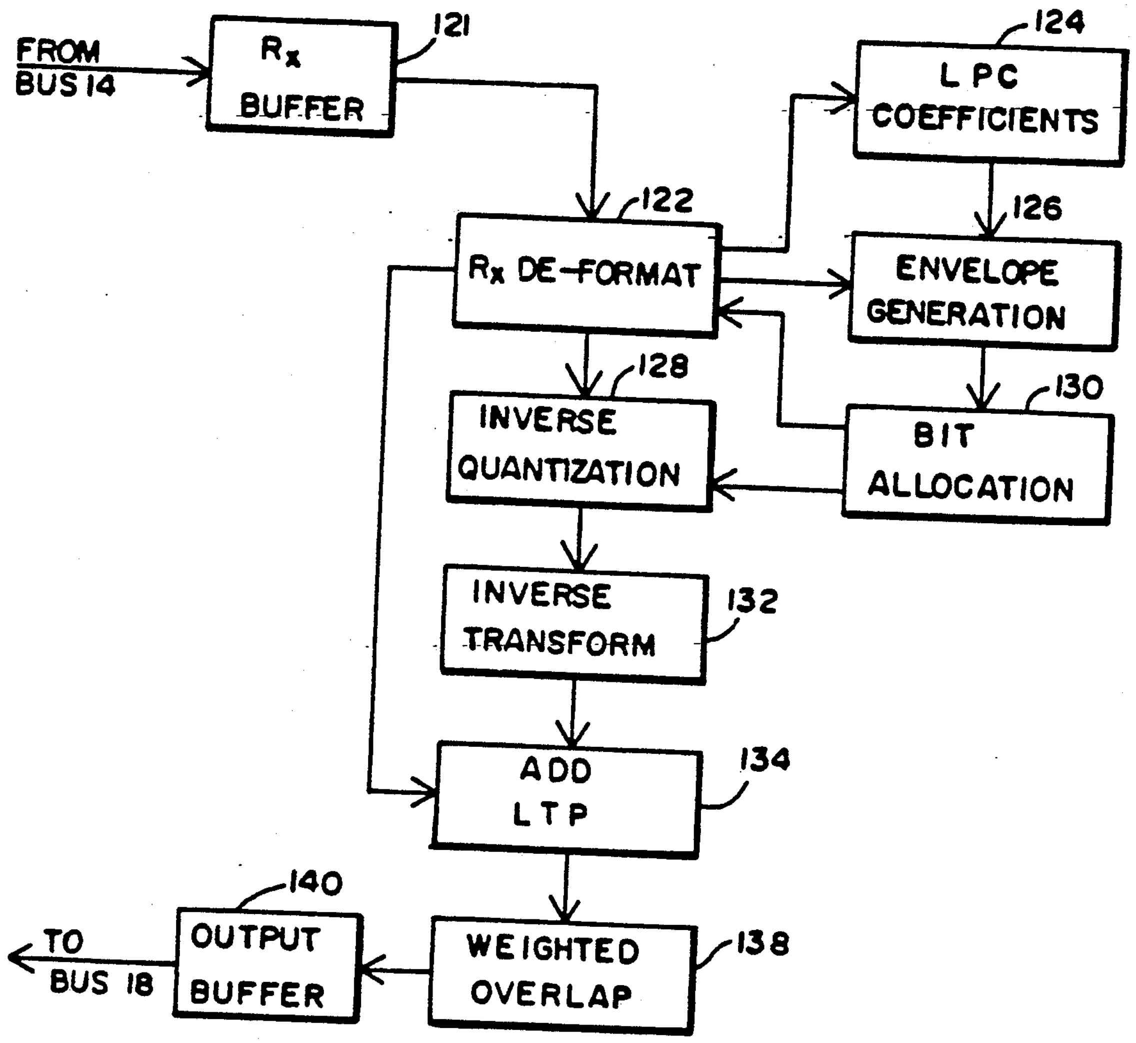
FIG. 9 is a flow chart of those operations performed in the adaptive transform coder shown in FIG. 1, subsequent to reception.

Having determined the quantization gain factor at 98 and now having determined the bit allocation at 110 the quantization at 82 can be completed. Once the DCT coefficients have been quantized, they are formatted for transmission with the side information at 118. The resultant formatted signal is buffered at 120 and serially transmitted at a preselected frequency. Consider now the adaptive transform coding procedure utilized when a voice signal, adaptively coded in accordance with the principles of the present invention, is received. It will be recalled that such signals are presented on serial port bus 14 by interface 28. Referring to FIG. 9 such signals are first buffered at 121 in order to assure that all of the bits associated with a single block are operated upon relatively simultaneously. The buffered signals are thereafter de-formatted at 122.

The LPC coefficients, LTP parameters, pitch period, and pitch gain associated with the block and transmitted as side information are gathered at 122. It will be noted that these coefficients are already quantized. The spectral envelope is thereafter generated at 126 using the same procedure described in reference to FIG. 7. The resultant information is thereafter provided to both the inverse quantization operation 128, since it is reflective of quantizing gain, and to the bit allocation operation 130. The bit allocation determination is performed according to the procedure described in connection with FIG. 8.

The bit allocation information is provided to the inverse quantization operation at 128 so the proper number of bits is presented to the appropriate quantizer.

With the proper number of bits, each de-quantizer can de-quantize the DCT coefficients since the gain and number of bits allocated are also known. The de-quantized DCT coefficients are transformed back to the time domain at 132.

Since an LTP operation was performed on the time domain signal at 41, it is now necessary to add the pitch based components back to the time domain signal. The LTP coefficients are added according to the following formula:

$$s(n)=e(n)+\beta_1 \cdot s(n-M)+\beta_2 \cdot s(n-M-1) \tag{22}$$

where e(n) is the time domain signal generated at 132;

$\beta_1$ and $\beta_2$ are the LTP parameters; and

M is the pitch.

It will be recalled that $\beta_1$, $\beta_2$ and the pitch were transmitted as side information and such parameters are provided to step 134 from the deformatting step 122. Having added the periodicity information back into the time domain signal, it is now necessary to dewindow the signal at 138. In the preferred embodiment the present invention minimizes the effect of signal discontinuities between successive sample blocks. These discontinuities are alleviated by use of a weighted-overlap technique which is aimed at placing greater emphasis on samples from the previous block at the start of the overlap or window region and greater emphasis on the current block near the end of an overlap segment or window. Such weighted overlap technique is implemented according to the following formula:

$$s(k+i)=\frac{(K-i)}{K}S_{j-1}(k+i)+\frac{i}{K}S_j(k+i) \tag{22}$$

$$i=o,\ldots,K-1$$

where $S_j$ is equal to the present sample block;

$s_{j-1}$ is equal to the previous sample block

The dewindowed blocks are buffered at 140 and aligned in sequential form prior to presentation on bus 18. Signals thus presented on bus 18 are converted from parallel to serial form by convertor 30 (FIG. 1) and either output at 32 or presented to analog interface 36.

While the invention has been described and illustrated with reference to specific embodiments, those skilled in the art will recognize that modification and variations may be made without departing from the principles of the invention as described herein above and set forth in the following claims.

What is claimed is :

1. Apparatus for removing the periodicity from a speech signal in a transform coder prior to the quantization of said speech signal, which speech signal is a sampled time domain speech signal composed of information samples, said transform coder sequentially segregating said speech signal into blocks of information samples, comprising:

filter means for filtering each of said blocks of samples to remove spurious peaks;

clipping means for enhancing certain samples contained in said blocks necessary to determine pitch;

function means for generating an autocorrelation function of each of said sample blocks after it has been operated upon by said clipping means;

pitch means for determining the maximum value in said autocorrelation function;

LTP means for determining long term predictor parameters in relation to said maximum value and other values contained in said autocorrelation function; and a difference means for calculating a periodicity value for each sample in said block wherein the calculation of said periodicity value is based upon said maximum value and said long term predictor parameter and for generating a revised block of difference samples by subtracting said periodicity value from the corresponding sample.

2. The apparatus of claim 1, wherein said filter means comprises a low pass filter having a frequency range from approximately 0 Hz to approximately 1650 Hz.

3. The apparatus of claim 1, wherein said filter means comprises an eight-tap finite impulse response filter having 3 dB cutoff frequencies at 1800 Hz and 2400 Hz.

4. The apparatus of claim 1, further comprising calculating means for calculating pitch gain in relation to said autocorrelation function, and threshold means for determining when said pitch gain exceeds a reference value.

5. The apparatus of claim 4, wherein said reference value is 0.25.

6. The apparatus of claim 1, wherein said clipping means comprises:

dividing means for dividing said blocks into a plurality of smaller blocks;

search means for searching said smaller blocks for the maximum value in each of said smaller blocks;

enhancing means for identifying those samples in each of said smaller blocks which exceed a threshold value; and combination means for combining all samples identified by said enhancing means into a single block.

7. The apparatus of claim 6, wherein said dividing means divides said blocks into two smaller blocks.

8. The apparatus of claim 7, wherein said enhancing means identifies samples according to the following formula:

$$c(n) = \begin{cases} +1 & s(n) \geqq T_c \\ -1 & s(n) \leqq T_c \\ 0 & \text{otherwise} \end{cases} \quad (1)$$

where $T_c$=amplitude threshold.

9. The apparatus of claim 1, wherein said difference signal is generated according to the following formula:

$$e(n)=s(n)-\beta_1 \cdot s(n-M)-\beta_2 \cdot s(n-M-1)$$

where

M=the pitch: and $\beta_1$ and $\beta_2$=the long term predictor parameters:

and wherein the long term predictor parameters are determined according to the formula:

$$\beta_1 = \frac{R(O)R(M) - R(1)R(M+1)}{[R(O)^2 - R(1)^2]};$$

$$\beta_2 = \frac{R(O)R(M+1) - R(1)R(M)}{[R(O)^2 - R(1)^2]}$$

where

R(O)=the ACF value at the origin;

R(1)=the ACF value at 1;

R(M−1)=the ACF value at the pitch−1;

R(M)=the ACF value at the pitch; and

R(M+1)=the ACF value at the pitch+1.

10. The apparatus of claim 9, further comprising a comparator for comparing the sum of $\beta_1$ and $\beta_2$ to a reference value.

11. The apparatus of claim 10, wherein said reference value is 8/9.

12. The apparatus of claim 10, further comprising scaling means for scaling $\beta_1$ and $\beta_2$ so that $\beta_1+\beta_2$=said reference value.

13. The apparatus of claim 9, further comprising a comparator for determining whether R(M+1) is greater than R(M−1).

14. The apparatus of claim 13, further comprising means for substituting the value of R(M−1) for R(M+1) prior to the calculation of $\beta_1$ and $\beta_2$ interchange means for interchanging the values calculated for $\beta_1$ and $\beta_2$ and decrement means for decrementing Pitch (M) by one prior to transmission.

15. Apparatus for removing the periodicity from a speech signal in a transform coder prior to the quantization of said speech signal, which speech signal is a sampled time domain speech signal composed of information samples, said transform coder sequentially segregating said speech signal into blocks of information samples, comprising:

pitch means for determining the pitch in each of said sample blocks;

LTP means for determining a long term prediction parameter for each of said blocks based on the pitch determined for each block;

a difference means for calculating a periodicity value for each sample in said block wherein the calculation of said periodicity value is based upon said pitch and said long term predictor parameter and for generating a revised block of difference samples by subtracting said periodicity value from the corresponding sample; and adaptive transform coding means for performing adaptive transform coding on each of said difference blocks.

16. A method for removing the periodicity from a speech signal in a transform coder prior to the quantization of said speech signal, which speech signal is a sampled time domain speech signal composed of information samples, said transform coder sequentially segregating said speech signal into blocks of information samples, comprising the steps of:

filtering each of said blocks of samples to remove spurious peaks;

enhancing certain samples contained in said blocks necessary to determine pitch;

generating an autocorrelation function of each of said sample blocks after it has been operated upon by said clipping means;

determining the pitch by determining the maximum value in said autocorrelation function;

determining long term predictor parameter in relation to said maximum value and other values contained in said autocorrelation function;

calculating a periodicity value for each sample in said block wherein the calculation of said periodicity value is based upon said maximum value and said long term predictor parameter; and generating a revised block of difference samples by subtracting said periodicity value from the corresponding sample.

17. The method of claim 16, wherein said step of filtering comprises providing a low pass filter having a frequency range from approximately 0 Hz to approximately 1650 Hz.

18. The method of claim 16, wherein said step of filtering comprises providing an eight-tap finite impulse response filter having 3 dB cutoff frequencies at 1800 Hz and 2400 Hz.

19. The method of claim 16, further comprising the steps of calculating pitch gain in relation to said autocorrelation function, and determining when said pitch gain exceeds a reference value.

20. The method of claim 19, wherein said reference value is 0.25.

21. The method of claim 16, wherein the step of enhancing comprises the steps of:

dividing said blocks into a plurality of smaller blocks;

searching said smaller blocks for the maximum value in each of said smaller blocks;

identifying those samples in each of said smaller blocks which exceed a threshold value; and combining all samples identified by said enhancing means into a single block.

22. The method of claim 21, wherein the step of dividing comprises dividing said blocks into two smaller blocks.

23. The method of claim 22, wherein said step of enhancing identifies samples according to the following formula:

$$c(n) = +1 \quad s(n) \geqq T_c \qquad (1)$$
$$= -1 \quad s(n) \leqq T_c$$
$$= 0 \quad \text{otherwise}$$

where $T_c$=amplitude threshold.

24. The apparatus of claim 16, wherein said step of generating a difference signal is accomplished according to the following formula:

$$e(n)=s(n)-\beta_1 \cdot s(n-M)-\beta_2 \cdot s(n-M-1)$$

where

M=the pitch; and $\beta_1$ and $\beta_2$=the long term predictor parameters;

and wherein the step of determining said long term predictor parameters are determined according to the formula:

$$\beta_1 = \frac{R(O)R(M) - R(1)R(M+1)}{[R(O)^2 - R(1)^2]};$$

$$\beta_2 = \frac{R(O)R(M+1) - R(1)R(M)}{[R(O)^2 - R(1)^2]}$$

where

R(O)=the ACF value at the origin;

R(1)=the ACF value at 1;

R(M−1)=the ACF value at the pitch −1;

R(M)=the ACF value at the pitch; and

R(M+1)=the ACF value at the pitch +1.

25. The method of claim 24, further comprising the step of comparing the sum of $\beta_1$ and $\beta_2$ to a reference value.

26. The method of claim 25, wherein said reference value is 8/9.

27. The method of claim 25, further comprising the step of scaling $\beta_1$ and $\beta_2$ reference value.

28. The method of claim 24, further comprising the step of determining whether R(M+1) is greater than R(M−1).

29. The method of claim 28, further comprising the steps of substituting the value of R(M−1) for R(M+1) prior to the calculation of $\beta_1$ and $\beta_2$, interchanging the values calculated for $\beta_1$ and $\beta_2$ and decrementing Pitch (M) by one prior to transmission.

30. A method for removing the periodicity from a speech signal in a transform coder prior to the quantization of said speech signal, which speech signal is a sampled time domain speech signal composed of information samples, said transform coder sequentially segregating said speech signal into blocks of information samples, comprising the steps of:

determining the pitch in each of said sample blocks;

determining a long term prediction parameter for each of said blocks based on the pitch determined for each block;

calculating a periodicity value for each sample in said block wherein the calculation of said periodicity value is based upon said pitch and said long term predictor parameter;

generating a revised block of difference samples by subtracting said periodicity value from the corresponding sample; and performing adaptive transform coding on each of said difference blocks.

31. Apparatus for decoding a coded speech signal wherein such coded speech signal includes sequential blocks of transform coefficients which have been quantized in relation to a bit allocation signal generated in relation to scaled spectral envelope information and side information including pitch, long term predictor parameter and linear prediction coefficients, representative of the variance of said quantized transform coefficients, comprising:

envelope generation means for generating the spectral envelope of each of said blocks of information samples based upon said linear prediction coefficients;

bit allocation means for generating a bit allocation signal in relation to said spectral envelope;

de-quantization means for de-quantizing said transform coefficients in response to said bit allocation signal and for generating blocks of de-quantized transform coefficients;

inverse transformation means for transforming said de-quantized transform coefficients from said transform domain into said time domain; and summation means for calculating a periodicity value for each sample in said block wherein the calculation of said periodicity value is based upon said pitch and said long term predictor parameter and for generating a revised block of difference samples by adding said periodicity value to the corresponding sample.

* * * * *